(12) United States Patent
Funk et al.

(10) Patent No.: US 7,559,410 B2
(45) Date of Patent: Jul. 14, 2009

(54) ELECTRONIC DRIVE OF A PARKING BRAKE

(75) Inventors: Andreas Funk, Eschborn (DE); Michael Helmer, Schwalbach/Ts (DE); Hans-Peter Hoffmann, Bad Soden am Taunus (DE); Jens Luebben, Rastede (DE); Helmut Pfalzgraf, Steinbach (DE); Gerhard Pfanzer, Bad Camberg (DE); Stefan Pfeiffer, Eppstein (DE)

(73) Assignee: Siemens Aktiengesellschaft, Munich (DE)

( * ) Notice: Subject to any disclaimer, the term of this patent is extended or adjusted under 35 U.S.C. 154(b) by 347 days.

(21) Appl. No.: 11/389,187

(22) Filed: Mar. 27, 2006

(65) Prior Publication Data

US 2006/0231352 A1 Oct. 19, 2006

(30) Foreign Application Priority Data

Apr. 18, 2005 (DE) .................. 10 2005 018 003

(51) Int. Cl.
*F16D 65/14* (2006.01)

(52) U.S. Cl. .................. 188/2 D; 188/156; 74/505

(58) Field of Classification Search .............. 714/500.5, 714/505; 188/2 D, 156, 158, 162, 265
See application file for complete search history.

(56) References Cited

U.S. PATENT DOCUMENTS

| | | | | |
|---|---|---|---|---|
| 2,073,794 | A * | 3/1937 | Haseltine ...................... | 74/505 |
| 5,148,894 | A | 9/1992 | Eddy, Jr. | |
| 5,590,744 | A | 1/1997 | Belmond | |
| 6,098,762 | A * | 8/2000 | Reimann et al. ........... | 188/72.5 |
| 6,533,082 | B2 * | 3/2003 | Gill et al. .................... | 188/156 |
| 6,880,424 | B2 * | 4/2005 | McMillen .................. | 74/500.5 |
| 7,055,660 | B2 * | 6/2006 | Friesen ....................... | 188/265 |
| 2002/0084154 | A1 * | 7/2002 | Peter .......................... | 188/156 |
| 2004/0026195 | A1 * | 2/2004 | Baier-Welt et al. .......... | 188/265 |
| 2005/0189183 | A1 * | 9/2005 | Gil et al. .................... | 188/2 D |

FOREIGN PATENT DOCUMENTS

| | | |
|---|---|---|
| DE | 695 14 196 T2 | 5/1996 |
| DE | 196 53 541 A1 | 6/1998 |
| DE | 100 43 739 A1 | 3/2002 |
| EP | 1 158 198 A1 | 11/2001 |
| WO | WO 2004/089715 A1 | 10/2004 |

OTHER PUBLICATIONS

Derwent Abstract—DE-100 43 739 A1; Mar. 21, 2002; Fico Cables, S.A., Barcelona, Spain.
Derwent Abstract—DE-695 14 196 T2; May 8, 1996; PAe Reinhard, Skuhra, Weise & Partner, D-80801 München, Germany.
Derwent Abstract—EP-1 158 198 A1; Nov. 28, 2001; Siemens Aktiengesellschaft, D-80333 München, Germany.
Derwent Abstract—DE-196 53 541 A1; Jun. 25, 1998; Audi AG, D-85057 Ingolstadt, Germany.

* cited by examiner

*Primary Examiner*—Christopher P Schwartz
(74) *Attorney, Agent, or Firm*—King & Spalding L.L.P.

(57) ABSTRACT

An electric drive for a parking brake is disclosed, the brake having a rotationally driven screw nut which is in engagement with two spindles which are aligned with one another, have threads running in opposite directions, and which are fixed in the rotational direction, can be moved in a translatory fashion and are each provided with a cable holder for connecting to brake elements. Here, one of the two spindles is a hollow spindle whose internal diameter is greater than the external diameter of the other spindle so that when the screw nut rotates, the spindle on one side can be retracted in a telescopic fashion into the hollow spindle on the other side.

9 Claims, 2 Drawing Sheets

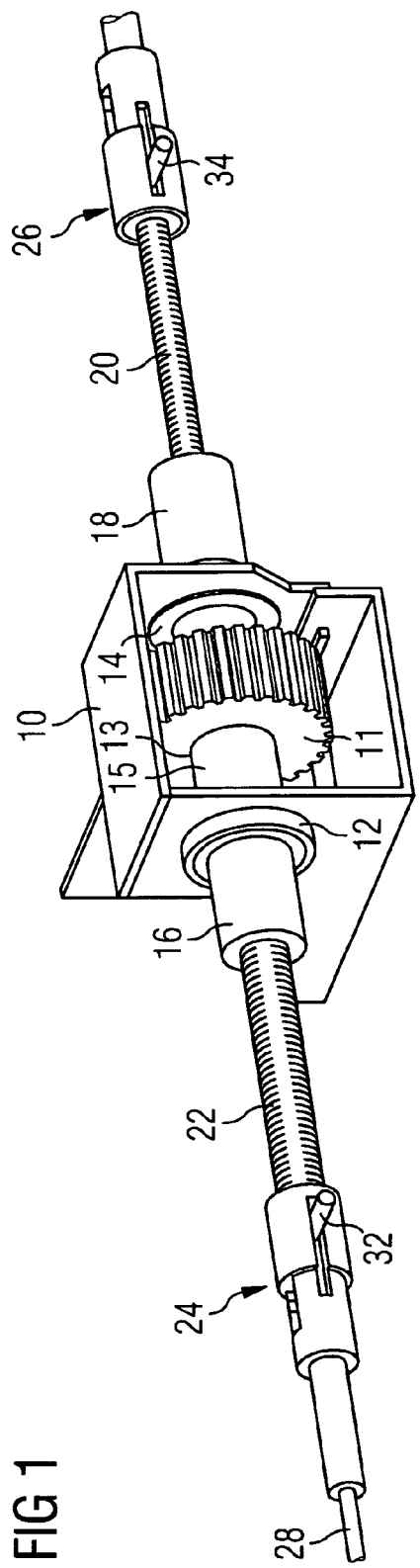
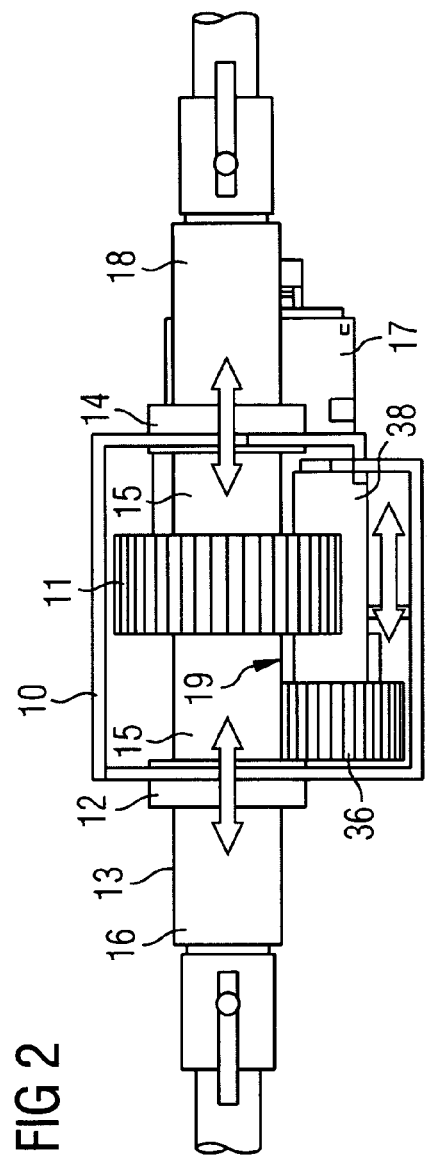

ELECTRONIC DRIVE OF A PARKING BRAKE

BACKGROUND OF THE INVENTION

The present invention is concerned with an electric drive for a parking brake having a rotationally driven screw nut which is in engagement with two spindles which are aligned with one another, have threads running in opposite directions, are fixed in the rotational direction, can be moved in a translatory fashion and are each provided with a cable holder for the brake elements.

Parking brakes which can conventionally be activated manually are being increasingly replaced in motor vehicles by electrically driven parking brakes since parking brakes which can be controlled manually or else controlled by means of a foot pedal have a complex mechanism which has to be serviced regularly and takes up a considerable amount of space. Furthermore, the effect of the parking brake is dependent on the operating force of the driver.

DE 695 14 196 T2 describes a device of the type mentioned at the beginning.

However, in order to install this device a very large amount of space must be made available owing to its large overall length. The large overall length results from the adjustment paths which have to be made available for the right side and left side, the necessary safety margin, the design-related supplements and the various aspects which relate to tolerance, for example installation, change in length due to temperature fluctuations, material wear on the brake elements and the like.

SUMMARY OF THE INVENTION

The object of the present invention is to provide an electric drive of a parking brake whose overall length is as short as possible.

According to the invention, the object is achieved by means of an electric drive of a parking brake of the type described at the beginning in which one of the two spindles is a hollow spindle whose internal diameter is greater than the external diameter of the other spindle so that when the screw nut rotates, the spindle on one side can be retracted in a telescopic fashion into the hollow spindle on the other side.

The advantage of the inventive electric drive of a parking brake is that retracting one spindle into the other spindle which is embodied as a hollow spindle can considerably reduce the overall length.

An embodiment in which the screw nut is embodied as a hollow body at one end of which a first internal thread is provided for engagement with the external thread of the hollow spindle and at the other end of which a second internal thread with a relatively small diameter and running in the opposite direction to the first thread is provided for engagement with the external thread of the relatively thin spindle so that both spindles can be moved by rotating the screw nut is particularly preferred.

An embodiment in which the two internal threads of the screw nut have the same lead in order to bring about the same change in length at the two spindles with respect to the rotational angle of the screw nut is also preferred. However, different leads are also conceivable in order to obtain different changes in length as far as this is desired in the specific application cases.

In one preferred embodiment, the drive has a servomotor such as is also used at other locations of a vehicle, for example in a window lift.

An embodiment in which the screw nut is driven with the aid of a step down transmission in order to be able to install the smallest possible motors with low power is particularly preferred.

In one preferred embodiment, the rotationally driven screw nut is permanently connected to a gearwheel of the step down transmission. This embodiment saves space and is advantageous for reasons of strength and assembly.

In addition, an embodiment in which the screw nut and the spindles are mounted in an axially floating fashion with respect to one another is preferred. This power/displacement compensation ensures that the same braking forces are built up in both brake elements in order to avoid obliquely pulling brakes. For example, the uneven wear on the right and left brake linings and the associated various application paths of the brake elements or else fabrication tolerances can be compensated for in this way.

A fixed drive pinion is expediently made wider than the gearwheel so that in the state in which the gearwheel is in engagement with the drive pinion, said gearwheel can move, together with the screw nut and the spindles, axially in relation to said drive pinion. As a result the compensation of forces between the left and right brake elements can be brought about without having to dispense with axially fixed, operationally reliable mounting of the drive pinion. The overall structural expenditure on the mounting is relatively low here.

In a further preferred embodiment, a self locking function is provided by suitable thread shapes in the engagement region between the spindles and the screw nut or in the region of the step down transmission, as a result of which the parking brake also acts in the state of rest of the electric transmission motor if said brake was previously applied.

The rotational securement of the spindles is expediently carried out in each case by means of the cable holder.

In one preferred embodiment, the drive has a housing which is sealed with respect to dirt and moisture and on which jackets of the two cable pulls are supported. The sealing of the housing permits the drive also to be installed at unprotected locations in the region of the chassis. The cable pull and thus the spindles are preferably supported in the direction of rotation on the housing.

BRIEF DESCRIPTION OF THE SEVERAL VIEWS OF THE DRAWINGS

An exemplary embodiment of the invention will be described in more detail below with reference to the appended drawings, in which:

FIG. 1 is a schematic perspective view of a drive of an electric parking brake;

FIG. 2 shows a longitudinal section through the drive according to FIG. 1;

DETAILED DESCRIPTION OF THE INVENTION

Figure 3:
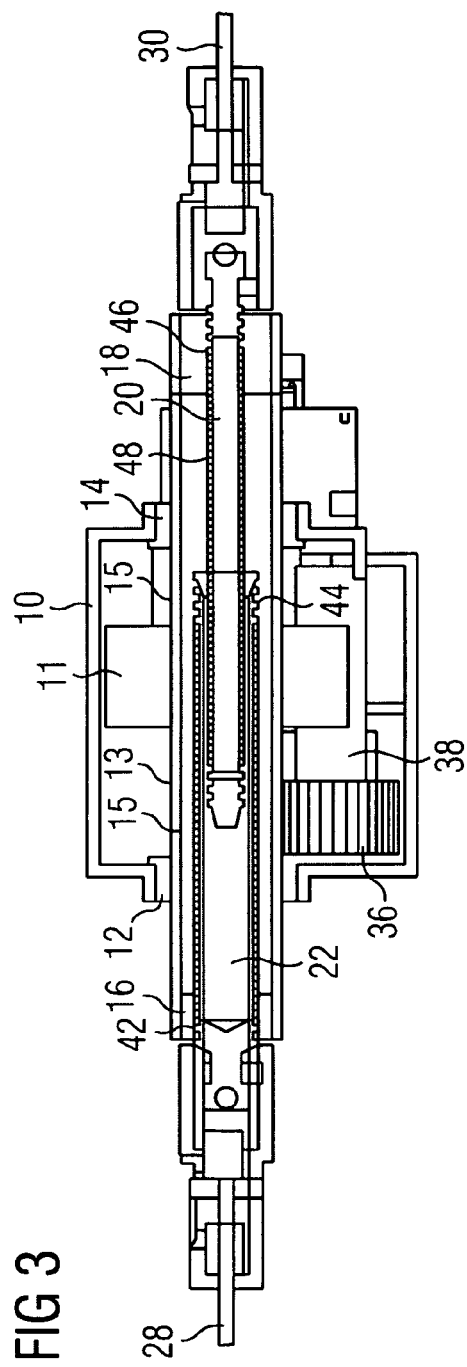
FIG. 3 shows a longitudinal section through the drive according to FIG. 2 in the retracted state of the spindles.

FIG. 1 shows a schematic perspective view of a bearing block 10 with a rotationally driven screw nut 13 which is mounted in an axially movable fashion in bearings 12, 14 and is driven by a servomotor 17 by means of a two-stage step down transmission 19, only one gearwheel 11 of which can be seen in FIG. 1. The screw nut 13 (see also FIGS. 3 and 4) which is embodied as a hollow element has a central region 15 to which the gearwheel 11 is permanently connected. The screw nut 13 is provided at its ends with two nut inserts 16, 18 which are inserted into the hollow elements and have threads 42, 46 running in opposite directions, and each of which nut inserts 16, 18 is in engagement with a spindle 20, 22, respectively. Both threads 42, 46 have the same lead despite their different diameter. The two spindles 20, 22 are aligned with one another, one of the spindles being a hollow spindle 22 whose internal diameter is greater than the external diameter of the other spindle 20 so that when the screw nut 13 rotates, the thinner spindle 20 on one side can be retracted in a telescopic fashion into the hollow spindle 22 on the other side. The outer ends of the spindles are each connected to a cable 28, 30 with the aid of a cable holder 24, 26, respectively. The cable holders 24, 26 have devices 32, 34 for rotationally securing the spindles 20, 22 to a housing (not shown).

FIG. 2 shows a schematic longitudinal section through the bearing block 10 with the bearings 12, 14 and the screw nut 13 with the central region 15 and the two nut inserts 16, 18. As is apparent from FIG. 2, the screw nut 13 is driven by the electric motor 17 by means of the two-stage step down transmission 19, one gearwheel 36 which intermeshes with a pinion (not shown) seated on the engine shaft and forms a first transmission stage with the latter being arranged on a common shaft with a drive pinion 38 which, with the gearwheel 11, forms the second transmission stage, the drive pinion 38 being made wider than the gearwheel 11. As a result of the axially moveable bearings 12, 14 and the wide drive pinion 38, in the state in which the gearwheel 11 is in engagement with the drive pinion 38, said gearwheel 11 can move, together with the screw nut and the spindles 20, 22, axially relative to said drive pinion 38 during operation, represented by double-headed arrows in FIG. 2. The axial mobility of the unit composed of the screw nut 13 and spindles 20, 22 ensures there is a force/displacement compensation which ensures that there are uniform braking forces at the two braking elements.

FIG. 3 shows the drive of the electric parking brake in a retracted state of the spindles 20, 22 in a longitudinal section. As already mentioned, the screw nut 13 which is driven by means of the gearwheel 11 is embodied as a hollow element at one end of which the internal thread 42 in the nut insert 16 is in engagement with an external thread 44 of the hollow spindle 22, and at the other end of which the internal thread 46 with a relatively small diameter in the nut insert 18 is in engagement with an external thread 48 of the relatively thin spindle 20. The overall length of the drive which is saved by the present design is at least twice the distance by which the relatively thin spindle 20 is retracted into the hollow spindle 22, said distance being clearly shown in FIG. 3.

Figure 4:
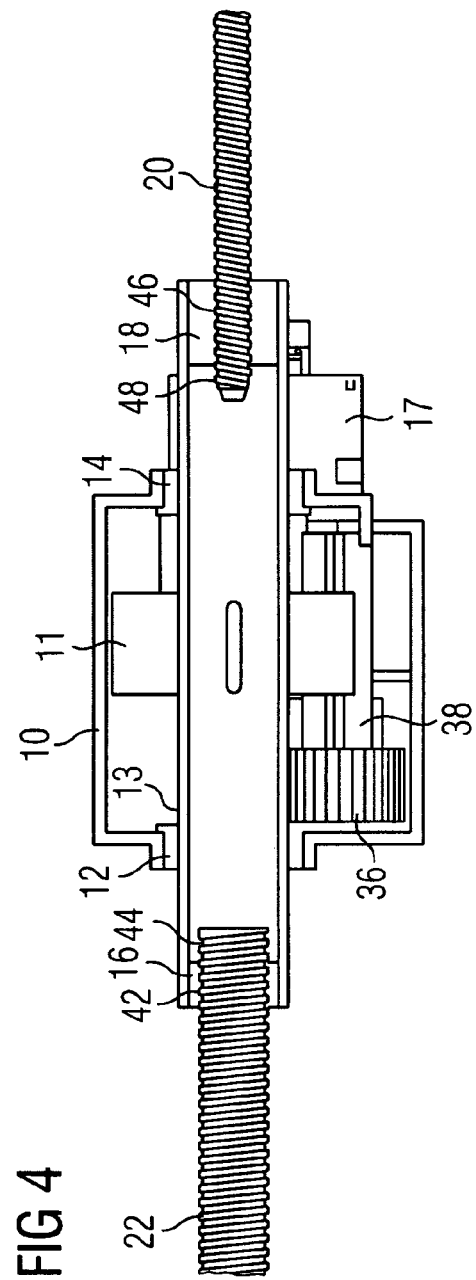
FIG. 4 shows a longitudinal section through the drive according to FIG. 2 in the extended state of the spindles.

The drive of an electric parking brake which is shown in FIG. 3 is shown in an extended state of the spindles 20, 22 in FIG. 4 in a longitudinal section.

We claim:

1. An electric drive for a parking brake, comprising a rotationally driven screw nut which is in engagement with two spindles which are aligned with one another, wherein the two spindles have threads running in opposite directions to each other, are fixed in the rotational direction, can be moved translational to each other, and are each provided with a cable holder for connecting to brake elements, wherein one of the two spindles is a hollow spindle whose internal diameter is greater than the external diameter of the other spindle so that when the screw nut rotates, the spindle on one side can be retracted in a telescopic fashion into the hollow spindle on the other side, wherein the screw nut and the spindles are axially movable to each other, wherein the rotationally driven screw nut is permanently connected to a gearwheel, and wherein a fixed drive pinion is made wider than the gearwheel so that in the state in which the gearwheel is in engagement with the drive pinion, said gearwheel can move, together with the screw nut and the spindles, axially in relation to said drive pinion.

2. The drive according to claim 1, wherein the screw nut is embodied as a hollow element at one end of which a first internal thread is provided for engagement with an external thread of the hollow spindle and at the other end of which a second internal thread with a relatively small diameter is provided for engagement with the external thread of the other spindle.

3. The drive according to claim 1, wherein the two internal threads of the screw nut have the same lead.

4. The drive according to claim 1, wherein the drive further comprises a servomotor.

5. The drive according to claim 1, wherein the screw nut is driven with the aid of a step down transmission.

6. The drive according to claim 5, wherein the step down transmission comprises the fixed drive pinion.

7. The drive, according to claim 1, wherein a self locking function is provided by suitable thread shapes in the engagement region between the spindles and the screw nut or in the region of the step down transmission.

8. The drive according to claim 1, wherein the rotational securement of the spindles is carried out in each case by means of the cable holder.

9. The drive according to claim 1, further comprising a housing which is sealed with respect to dirt and moisture and on which jackets of the two cable pulls are supported.

* * * * *